United States Patent [19]
Naito et al.

[11] Patent Number: 5,495,340
[45] Date of Patent: Feb. 27, 1996

[54] IMAGE READING APPARATUS HAVING COLOR CORRECTION ACCORDING TO TEMPEATURE CHANGE IMPROVED

[75] Inventors: Yoshikazu Naito; Shigeru Moriya, both of Toyokawa; Takayoshi Hayashi, Ikeda, all of Japan

[73] Assignee: Minolta Camera Kabushiki Kaisha, Osaka, Japan

[21] Appl. No.: 19,204

[22] Filed: Feb. 18, 1993

[30]     Foreign Application Priority Data

Feb. 21, 1992   [JP]   Japan .................. 4-034870

[51] Int. Cl.$^6$ ............................................. H04N 1/21
[52] U.S. Cl. ................................. 358/296; 358/516
[58] Field of Search ............................. 368/296, 298, 368/300, 302, 519, 520, 518, 515, 516, 517

[56]          References Cited

U.S. PATENT DOCUMENTS 4,945,405   7/1990   Hirota .
5,194,945   3/1993   Kadowaki et al. ................. 358/520

*Primary Examiner*—Mark J. Reinhart
*Attorney, Agent, or Firm*—Willian Brinks Hofer Gilson & Lione

[57]              ABSTRACT

A chromatic color pattern and a monochromatic color pattern are read by an image sensor. A masking coefficient in a color masking portion or a gamma conversion characteristic of a gamma correction portion are selected in accordance with the ratio V1/V0 of a read value V1 of the chromatic color pattern and a read value V0 of the monochromatic color pattern. An output of an image data is corrected by masking processing with the selected masking coefficient and the like.

18 Claims, 6 Drawing Sheets

| $V_1/V_0$ | MASKING COEFFICIENT |
|---|---|
| 0.8 ~ | $MC_1$ |
| 0.6 ~ | $MC_2$ |
| 0.4 ~ | $MC_3$ |
| ~ 0.4 | TROUBLE (CALL A SERVICEMAN) |

| $V_1/V_0$ | GAMMA CONVERSION CHARACTERISTIC |
|---|---|
| 0.8 ~ | $GM_1$ |
| 0.6 ~ | $GM_2$ |
| 0.4 ~ | $GM_3$ |
| ~ 0.4 | TROUBLE (CALL A SERVICEMAN) |

IMAGE READING APPARATUS HAVING COLOR CORRECTION ACCORDING TO TEMPEATURE CHANGE IMPROVED

BACKGROUND OF THE INVENTION

1. Field of the Invention

The present invention relates to image reading apparatuses, and more particularly, to an image reading apparatus reading an image by a color image sensor, and processing the same.

2. Description of the Related Art

An image reading apparatus reading a stationary image of a color original by an image sensor to provide an image signal after subjecting read image data to various processing has been conventionally used as image input means of a computer and image input means of a digital copying machine.

In a full color image reading apparatus, a light source having a large quantity of light such as a tungsten halogen lamp is often used. Light reflected from the original by the light source is separated into its spectral components of three primary colors through each transmission filter of R, G, B, to form an image on a monochromatic CCD (image sensor). Depending on how to separate light into its spectral components of three primary colors, there are various systems such as a filter switching system, an on-chip filter system and the like.

In order to cut a near infrared light components of a long wavelength of 700 nm or more, which causes noise, out of various light components reflected from the original, an interference film filter is generally inserted in a light path.

With popularization of color image processing, there are many cases in which a number of color originals are read continuously. With reading of the original made higher in speed, a quantity of light of the light source is increased. Therefore, temperatures of the image sensor, various filters and the like are easy to be elevated by heat discharged from the light source.

Rise of the temperature of the filters causes a change of spectral characteristics of the filters, whereby the level of quantity of light of each color light incident on the image sensor is altered. For example, in the inference film filter, moisture in the filter is evaporated by rise of the temperature, causing the transmission range to be shifted to the short wavelength to lower the transmittance of the red color light range. Therefore, as shown by a curve CL2 of FIG. 8, the level of quantity of light of the red color light incident on the CCD is lowered. Rise of the temperature of the CCD also changes its sensitiveness characteristics or output characteristics.

Consequently, color reproductivity of the image data provided from the image reading apparatus is degraded, causing a problem, for example, in a color copying machine or the like, that the chromaticity of the copied image is different from that of the original, and that the picture quality is degraded. Therefore, it is necessary to interrupt reading of the original data to wait for lowering of the temperature, whereby the operation efficiency has been substantially decreased.

SUMMARY OF THE INVENTION

One object of the present invention is to provide an image reading apparatus in which the picture quality is maintained regardless of a change of the temperature of the apparatus.

Another object of the present invention is to provide an image reading apparatus in which color correction is carried out properly according to a change of the temperature of the apparatus.

In order to achieve the objects, the image reading apparatus according to the present invention corrects, based on an output value of image reading means for a chromatic color pattern and an output value of the image reading means for a monochromatic color pattern, an output value of the image reading means for a color original image.

The image reading apparatus constituted as described above reads the chromatic color pattern and the monochromatic color pattern to correct the output value for the color original image, whereby the picture quality of the output image can be maintained regardless of the temperature change of the apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
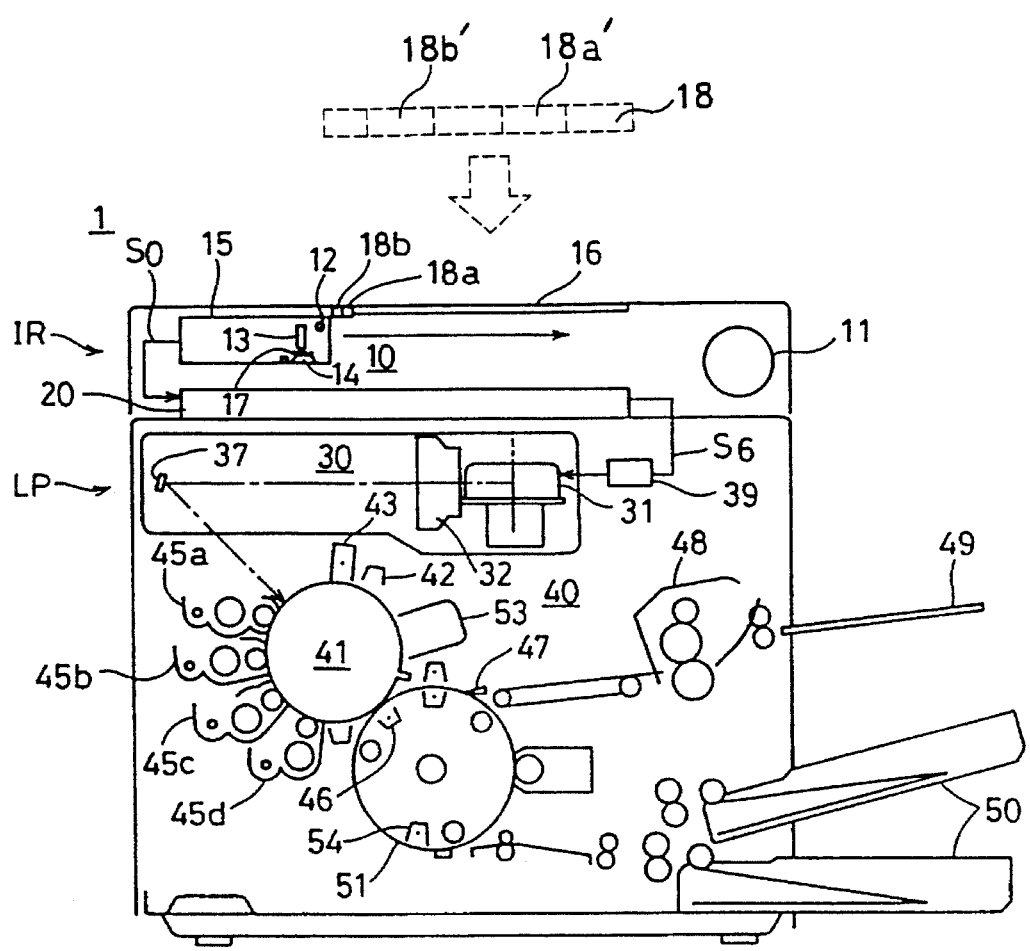
FIG. 1 is a sectional front view showing a schematic structure of a copying machine having an image reader portion according to one embodiment of the present invention.

FIG. 1 is a sectional front view showing a schematic structure of a copying machine 1 having an image reader portion IR according to one embodiment of the present invention.

Copying machine 1 includes the image reader portion IR subjecting a signal obtained by reading an original image to signal processing to provide the same as an image signal S6, and a laser printer portion LP forming a color image using electrophotography based on the image signal S6.

The image reader portion IR includes a scanning system 10 and a signal processing portion 20. Scanning system 10 includes a platen glass 16 for placing the original thereon, a scanner 15 scanning the lower portion of platen glass 16, and a motor 11 for driving scanner 15.

Scanner 15 includes an exposure lamp 12 irradiating the original, a lens array 13 converging light reflected from the original, a color image sensor 14, and an interference film filter 17 for cutting near infrared light of a long wavelength.

Color image sensor 14 includes a contact type CCD sensor of the on-chip filter system having spectroscopic filters transmitting each color of R (Red), G (Green) and B (Blue) repeatedly formed in sequence on CCD elements arranged in the main scanning direction.

A white or gray monochromatic color pattern 18a and a red pattern 18b of uniform concentration extending to the main scanning direction are attached to the leading end portion of platen glass 16 so that reading can be carried out at the start of scanning of scanner 15.

The original image is read as a color signal of additive three primary colors of R, G, and B by color image sensor 14. Photoelectric conversion signals S0 serving as an output of color image sensor 14 are converted to a four-color signal including subtractive three primary colors of Y (Yellow), M (Magenta), and C (Cyan) plus BK (Black) by signal processing portion 20 to be sent to the laser printer portion LP as the image signal S6. Description will be given later to signal processing portion 20.

The laser printer portion LP includes a laser optical system 30 having a semiconductor laser, not shown, as a light source, and an image forming system 40 carrying out electrophotography using a photoreceptor drum 41.

Laser optical system 30 includes a polygon mirror 31, an Fθ lens 32, a reflecting mirror 37 and the like. The laser optical system 30 emits laser light modulated by an image signal provided for each line from a buffer memory 39 to expose photoreceptor drum 41.

In image forming system 40, a main eraser 42, a corona charger 43, four developing devices 45a to 45d, a transfer drum 51, a cleaner 53 and the like are disposed in the periphery of photoreceptor drum 41.

A latent image corresponding to the original is formed by the exposure on the surface of photoreceptor drum 41 uniformly charged by corona charger 43. The latent image is developed as any of toner images of Y, M, C, BK by any of developing devices 45a to 45d. The toner images are transferred by a transfer charger 46 on paper wound around transfer drum 51.

In the case of full color copying, registration of toner images of four colors is carried out at transfer drum 51, and then the paper is detached from transfer drum 51 by a copy paper separation claw 47 to be fed to a fixing device 48. The paper to which toner images are fixed is discharged to a discharge tray 49.

The paper is fed from a paper cassette 50 to transfer drum 51 to be attracted electrostastically by a vacuum charger 54 to be wound around transfer drum 51.

Figure 2:
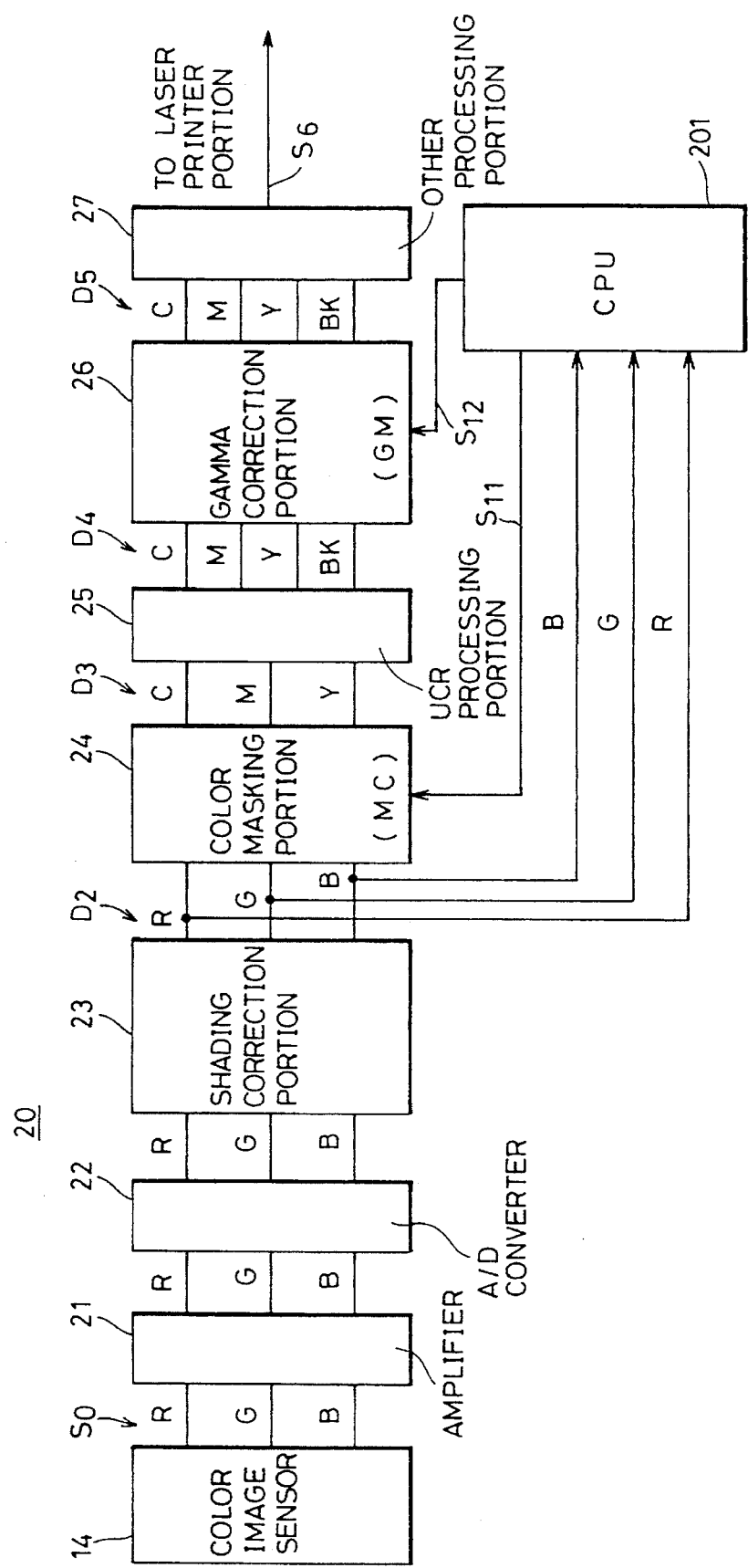
FIG. 2 is a block diagram showing a structure of a signal processing portion of the copying machine of FIG. 1.

FIG. 2 is a block diagram showing a structure of signal processing portion 20.

The photoelectric conversion signal S0 from color image sensor 14 is amplified to a predetermined level by an amplifier 21 to be applied to an A/D conversion portion 22.

A/D conversion portion 22 quantizes the photoelectric conversion signal S0 and converts the same to image data of, for example, 128 tones.

A shading correction portion 23 carries out shading correction for compensating light distribution of exposure lamp 12 and the difference in sensitiveness among respective pixels of color image sensor 14.

A color masking portion 24 generates image data D3 corresponding to Y, M and C from image data D2 corresponding to each color of R, G and B. When the image data D3 is generated, the masking coefficient of matrix used for concentration conversion is selected based on the read values of monochromatic color pattern 18a and red pattern 18b read at the start of scanning of the original. Detail description will be given later.

An UCR processing portion 25 carries out background color removal processing in order to provide higher contrast as a whole to obtain a clear image, so that image data D4 corresponding to each color of Y, M, C and BK is provided.

A gamma correction portion 26 includes a non-volatile RAM storing a concentration conversion table for data correction. Gamma correction portion 26 provides image data D5 having the image data D4 corrected so that non-linear concentration reproduction characteristics of image forming system 40 are compensated.

The image data D5 is sent to the laser printer portion LP as the image signal S6 after being subjected to processing for editing and improvement of picture quality and binary processing for half tone reproduction by a dither method or the like by another processing portion 27.

Color masking portion 24 carries out masking processing in accordance with the following equations (1) to (3) to generate the image data D3.

$$M = a_{11}B - a_{12}G + a_{13}R \quad (1)$$

$$C = a_{21}B + a_{22}G - a_{23}R \quad (2)$$

$$Y = -a_{31}B + a_{32}G + a_{33}R \quad (3)$$

The masking coefficients MC, which are combinations of coefficients $a_{11}$ to $a_{13}$, $a_{21}$ to $a_{23}$ and $a_{31}$ to $a_{33}$ used in these equations are prepared in plural. They are selected according to the ratio V1/V0 of the read value V1 of red pattern 18b and the read value V0 of monochromatic color pattern 18a read at the start of scanning of the original.

Description will now be given to the reason why the red pattern and the monochromatic color pattern are compared.

Figure 7:
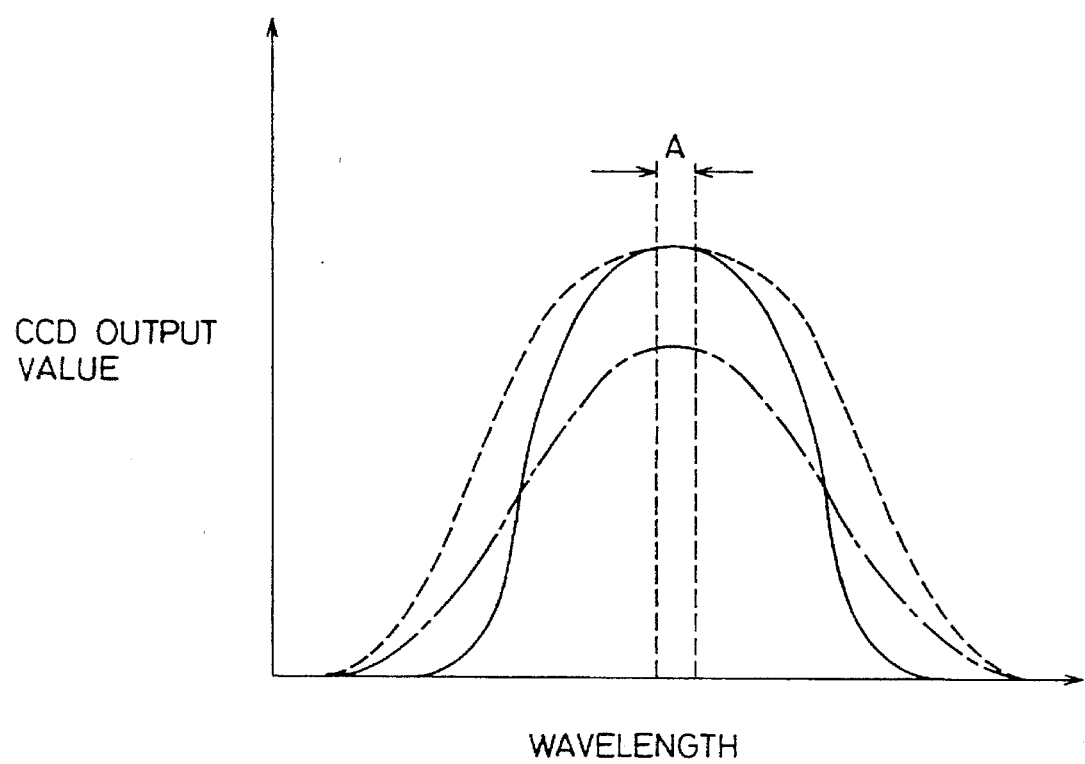
FIG. 7 is a graph showing the relation between the output value of the CCD and the wavelength of light transmitting the filter for explaining the feature of the present invention.
Figure 8:
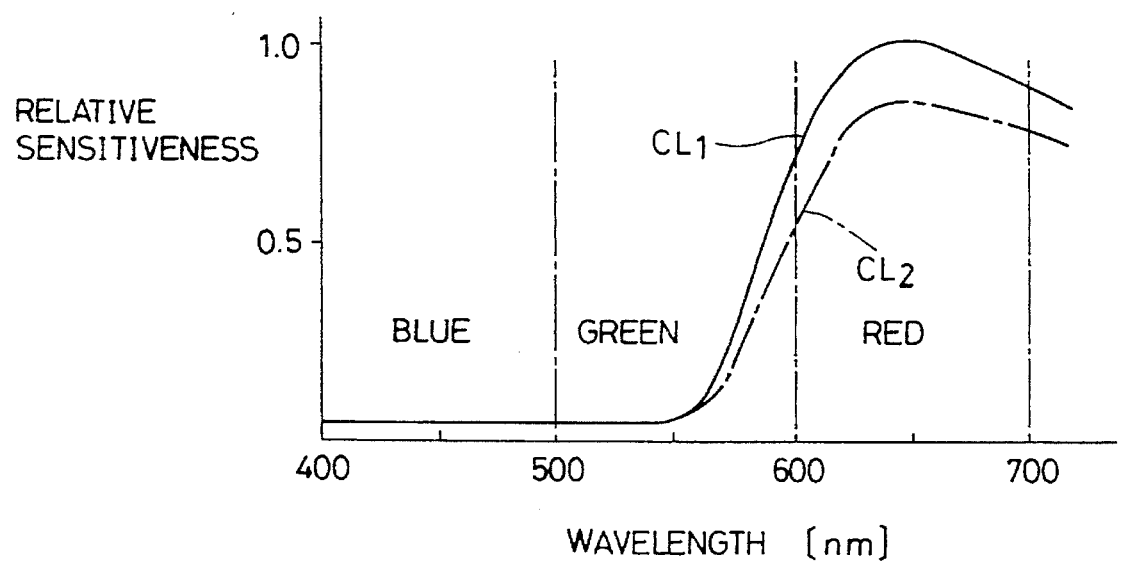
FIG. 8 is a diagram showing the state of rise of sensitiveness change in a red color range according to rise of temperature of a general interference film filter.

Generally, the full color image reader detects a quantity of light for each color by separating light reflected from the original into three colors by each of filters. Therefore, a CCD for red, for example, receives light of not only pure red but also its peripheral colors to provide the corresponding output. The graph in FIG. 7 shows the state with regard to, for example, red. The ordinate shows the value of output from the CCD, and the abscissa shows the wavelength of light transmitting the filter. For example, assume that, when distribution of the initial amount of output from the CCD is indicated by a solid line in the figure, distribution of the amount of output after a predetermined time is changed as indicated by a dotted line in the figure by a characteristic change due to the temperatures of the filter and the like. Assume that distribution of the amount of output from the CCD is corrected to that shown by a dot dash line in the figure so that the amount of output from the CCD simply assumes a constant value, as described above. As can be seen from comparison between the output distributions shown by the solid line and the dot dash line, they are substantially different in the amounts of output within a pure red range shown by A in the figure, although they are the same in the amounts of output as a whole. As a result, the color balance as a whole is destroyed.

In the present invention, the amount of attenuation in the red range A can be detected by reading red pattern 18b having a wavelength near to that of the red portion of the image, and the quantity of light of the red range A can be corrected by the ratio of the whole quantity of light attenuated (obtained by reading of the monochromatic color pattern) to the quantity of light of the red range with the color balance maintained.

Read values V1, V0 and the ratio value V1/V0 are calculated by a CPU 201 based on the image data D2 provided from shading correction portion 23. Based on the calculation result, a select signal S11 for selecting the masking coefficient MC is provided from CPU 201 to color masking portion 24.

Figures 3, 4:
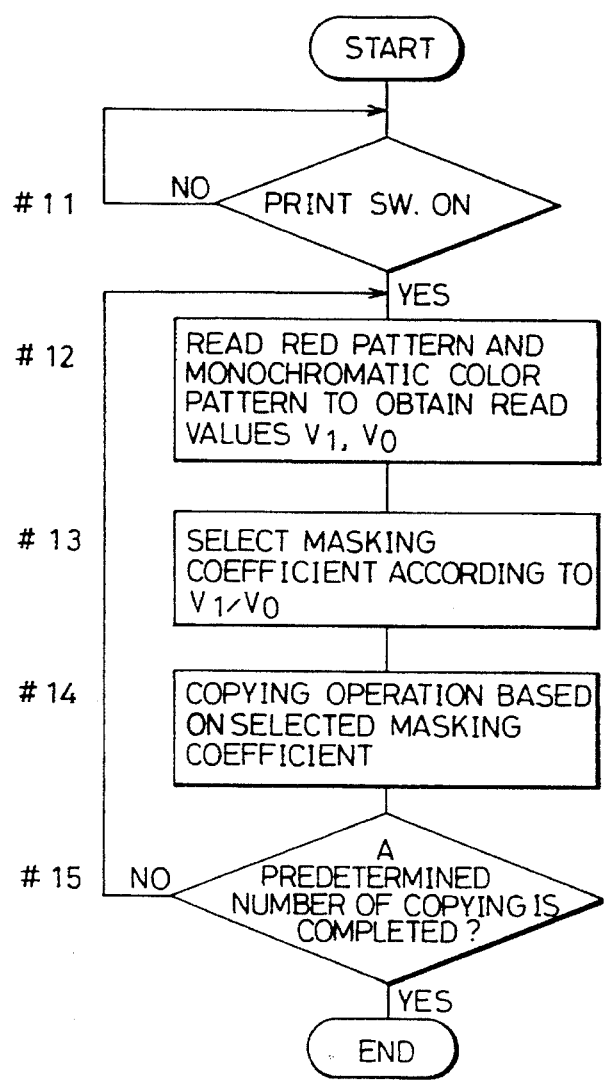
FIG. 3 is a diagram showing the relation between the ratio of the read values V1/V0 and the masking coefficients according to the one embodiment of the present invention.
FIG. 4 is a flow chart showing the color correction processing at the time of copying according to the one embodiment of the present invention.

FIG. 3 is a diagram showing the relation between the ratio value V1/V0 and the masking coefficient MC.

Referring to FIG. 3, when the ratio value V1/V0 is 0.8 or more, the masking coefficient MC1 is selected; when 0.6 to 0.8, the masking coefficient MC2 is selected; when 0.4 to 0.6, the masking coefficient MC3 is selected, and when less than 0.4, "call a serviceman" is indicated as a trouble.

In these masking coefficients MC1 to 3, the coefficient $a_{23}$ is set so as to gradually increase as the ratio value V1/V0 becomes small. As a result, when the red read value V1 by color image sensor 14 relatively decreases in comparison with the white read value V0, the decrease of the red output is compensated by increase of the coefficient $a_{23}$, thereby preventing excess of C (Cyan) component in the image data D3.

More specifically, when such correction of the coefficient $a_{23}$ is not carried out, sensitiveness to red of the original image is decreased, causing red of the copied image to be darkened. For example, a vivid color of face becomes dark. However, by carrying out correction of the coefficient $a_{23}$, such color fading is prevented.

Therefore, as in the case where a number of originals are read continuously, when the temperatures of interference film filter 17 and the like are elevated because of heat discharged from exposure light 12 to decrease the sensitiveness of the red color range as shown by the curve CL2 of FIG. 7, the decrease is detected by reading red pattern 18b and monochromatic color pattern 18a at respective starts of scanning, and the masking coefficients MC1 to 3 of coefficients corresponding to the ratio value V1/V0 of the respective read values are selected, whereby the decrease of the red output is corrected.

As a result, color reproductivity of the copied image in copying machine 1 is prevented from decreasing, and the picture quality is maintained preferably. Furthermore, it is not necessary to interrupt copying to wait for lowering of the temperature, and the operation efficiency is not decreased.

FIG. 4 is a flow chart showing color correction processing at the time of copying.

When a print SW for starting the copy operation is pressed (step #11), scanner 15 starts scanning. At the rising time of the scanner, red pattern 18b and monochromatic color pattern 18a are read to obtain respective read values V1, V0 (step #12).

The masking coefficient MC is selected according to the ratio value V1/V0 of the read values V1, V0 (step #13). A processing operation of color masking portion 24 by selected masking coefficient MC and other various processing operations are carried out, whereby the copying operation according to scanning of the original by scanner 15 is carried out (step #14).

Until the copy operation of a predetermined number of copies is completed, processing of step #12 and thereafter is repeated (step #15).

Although color correction according to a temperature change is carried out in color masking portion 24 in the above-described embodiment, it can be carried out in the other processing portion, for example, in gamma correction portion 26.

More specifically, with the masking coefficient MC fixed, the concentration conversion table for data correction is selected by the select signal S12 according to the ratio value V1/V0, whereby the gamma conversion characteristic GM of the cyan component is made variable.

Figures 5, 6:
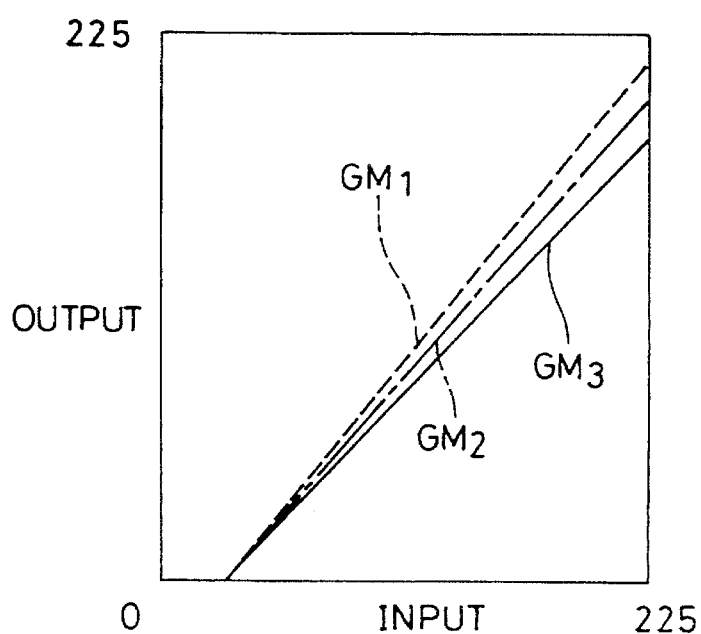
FIG. 5 is a diagram showing the relation between the ratio of the read values V1/V0 and the gamma conversion characteristics according to another embodiment of the present invention.
FIG. 6 is a diagram showing respective gamma conversion characteristics for cyan according to the another embodiment of the present invention.

FIG. 5 is a diagram showing the relation between the ratio value V1/V0 and the gamma conversion characteristics GM according to another embodiment of the present invention. FIG. 6 is a diagram showing respective gamma conversion characteristics GM for cyan according to this embodiment of the present invention.

Referring to FIG. 5, when the ratio value V1/V0 is 0.8 or more, the gamma conversion characteristic GM1 is selected; when 0.6 to 0.8, the gamma conversion characteristic GM2; when 0.4 to 0.6, the gamma conversion characteristic GM3; and when less than 0.4, "call a serviceman" is indicated.

Referring to FIG. 6, respective gamma conversion characteristics GM1 to 3 are set so that the output value of cyan to the input becomes small as the ratio value V1/V0 is small. As a result, similar to the case of the above-described masking coefficients MC, when the red read value V1 by color image sensor 14 relatively decreases in comparison with the white read value V0, increase of the cyan component in the image data D5 is suppressed, whereby color reproductivity is maintained.

In the above-described embodiment, the masking coefficients MC and the gamma conversion characteristics GM may be set to vary for colors other than red or cyan.

The case where correction of a chromaticity change according to rise of temperature is carried out only for red was described in the embodiment. This is because correction with regard to red affecting the most influence on color reproductivity of face is sufficient, since the color of face is the most noticeable in the color image and vision of human beings is sensitive to the color of face. However, it is needless to say that the optimum masking coefficient MC or gamma conversion characteristic GM may be selected by attaching color patterns for green, blue, or all the colors and by comparing respective read values as described above.

Although color correction according to rise of temperature was carried out every scanning by scanner 15 in the above embodiment, it may be carried out for every given number of scanning, every given time interval or the like.

In the above-described embodiment, monochromatic color pattern 18a and red pattern 18b are attached to the leading end portion of platen glass 16 so that these patterns may be read. Therefore, it is possible to carry out color correction by reading these patterns for every scanning by scanner 15. It is also possible to share monochromatic color pattern 18a with a white pattern for shading correction, providing a simple structure for color correction.

However, it is also possible to obtain the read values V1, V0 by other methods. For example, a monochromatic color pattern and a chromatic color pattern of various colors are drawn on one test pattern. The test pattern 18 having a monochromatic color pattern 18a' and a chromatic color pattern 18b' thereon as shown in dotted line in FIG. 1 placed on platen glass 16 to be read by one test scanning by scanner 15. The read values V1, V0 can be obtained from the image data D2 at a position corresponding to a predetermined color in the image data D2 obtained by the reading. By placing monochromatic color patterns for white and gray and a chromatic color pattern for various colors on platen glass 16, it is also possible to read the patterns by a plurality of test scannings to obtain the read values V1, V0 from the image data D2 for respective colors.

In the above-described embodiment, the case was described where the masking coefficients MC or the gamma conversion characteristics GM are selected in accordance with the ratio value V1/V0 of the read values V1, V0. However, the masking coefficients MC or the gamma conversion characteristics GM may be selected in accordance with the difference (V1–V0) of the read values V1, V0.

Not only temperature changes but also variations of color image sensor 14 or interference film filter 17 and changes of spectral sensitiveness characteristics by a change on standing thereof can be corrected. Therefore, it is possible to obtain a steady image with color favorably reproduced.

In the above-embodiment, structures of signal processing portion 20 and copying machine 1, the content or the order of processing of the flow chart can be variously changed. The present invention can be applied to various image reading apparatuses used in other than copying machines.

In the above-described embodiment, three CCDs are disposed in one pixel, and transmission filters of R, G, B are provided with respective CCDs. However, the present invention can be applied to the system in which one CCD is disposed in one pixel with filters exchanged sequentially.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:

image reading means for reading a color original image and for color-separating light from said color original image to provide an output for each separated color;

a chromatic color pattern separate from said color original image and provided at a position to be also readable by said image reading means to provide an output value corresponding to said chromatic color pattern;

a monochromatic color pattern separate from said color original image and provided at a position to be also readable by said image reading means to provide an output value corresponding to said monochromatic color pattern; and correcting means for correcting an output value for the color original image from said image reading means based on both said output value corresponding to said chromatic color pattern from said image reading means and said output value corresponding to said monochromatic color pattern from said image reading means.

2. The image reading apparatus as recited in claim 1, wherein said chromatic color pattern is a red pattern.

3. The image reading apparatus as recited in claim 1, wherein said monochromatic color pattern is a white pattern.

4. The image reading apparatus as recited in claim 1, wherein said correcting means includes calculating means for calculating a value of V1/V0 based on a read value V1 corresponding to said chromatic color pattern and a read value V0 corresponding to said monochromatic color pattern, and selecting means for selecting a correction coefficient set in accordance with a range of said calculated value of V1/V0 to correct an output value for each color based on said selected correction coefficient.

5. The image reading apparatus as recited in claim 4, and further including means for correcting a trouble when said value of V1/V0 exceeds a predetermined range.

6. The image reading apparatus as recited in claim 4, wherein said correction coefficient is a masking coefficient, said masking coefficient being a coefficient for converting an output corresponding to each color of red, green and blue to an output corresponding to each color of yellow, magenta and cyan.

7. The image reading apparatus as recited in claim 4, wherein said correction coefficient is a gamma conversion characteristic, said gamma conversion characteristic being a coefficient for correcting a concentration of the original image to be appropriate.

8. An image reading apparatus, comprising:

a platen glass for placing an original thereon;

a scanning optical system for scanning with exposure a color original placed on said platen glass;

an image sensor for color-separating light reflected from the color original to provide an output for each separated color;

an interference film filter provided on a light path of said reflected light for cutting a near infrared light component of said reflected light;

a chromatic color pattern separate from said color original provided at a position to be also exposable by said scanning optical system to provide an output value corresponding to said chromatic color pattern;

a monochromatic color pattern separate from said color original provided at a position to be also exposable by said scanning optical system to provide an output value corresponding to said monochromatic color pattern;

comparing means for comparing said output value corresponding to said chromatic color pattern with said output value corresponding to said monochromatic color pattern from said image sensor; and correcting means for correcting an output value for the color original from said image sensor based on a comparison result by said comparing means.

9. The image reading apparatus as recited in claim 8, wherein said image sensor includes three CCDs for one pixel, each CCD including a filter transmitting only light of red, green or blue.

10. The image reading apparatus as recited in claim 8, wherein said image sensor includes one CCD for one pixel and switches a filter inserted between said interference film filter and said CCD for another one among filters each transmitting only light of red, green and blue every time said scanning optical system scans the original.

11. The image reading apparatus as recited in claim 8, wherein said chromatic color pattern is a red pattern.

12. The image reading apparatus as recited in claim 8, wherein said chromatic color pattern is a green pattern.

13. The image reading apparatus as recited in claim 8, wherein said chromatic color pattern is a blue pattern.

14. The image reading apparatus as recited in claim 8, wherein said chromatic color pattern includes a plurality of colors of red, green and blue.

15. The image reading apparatus as recited in claim 1, and further including a platen glass for holding said color original image to be read by said image reading means, and wherein said chromatic color pattern and said monochromatic color pattern are fixedly attached to a leading end portion of said platen glass to be also read by said image reading means.

16. The image reading apparatus as recited in claim 1, and further including a platen glass for holding said color original image to be read by said image reading means, and wherein said chromatic color pattern and said monochromatic color pattern are provided on a test pattern placed on said platen glass to be also read by said image reading means.

17. The image reading apparatus as recited in claim 8, wherein said chromatic color pattern and said monochromatic color pattern are fixedly attached to a leading end portion of said platen glass to be also exposable by said scanning optical system.

18. The image reading apparatus as recited in claim 8, wherein said chromatic color pattern and said monochromatic color pattern are provided on a test pattern placed on said platen glass to be also exposable by said scanning optical system.

* * * * *